(12) United States Patent
Pagaza-Melero

(10) Patent No.: US 11,702,561 B2
(45) Date of Patent: Jul. 18, 2023

(54) HIGH-RESISTANCE WATERPROOFING COMPOSITION AND PRODUCTS MADE USING SAME

(71) Applicant: Victor Pagaza-Melero, Mexico City (MX)

(72) Inventor: Victor Pagaza-Melero, Mexico City (MX)

( * ) Notice: Subject to any disclaimer, the term of this patent is extended or adjusted under 35 U.S.C. 154(b) by 637 days.

(21) Appl. No.: 16/639,992

(22) PCT Filed: Aug. 17, 2018

(86) PCT No.: PCT/IB2018/000905
§ 371 (c)(1),
(2) Date: Feb. 28, 2020

(87) PCT Pub. No.: WO2019/034930
PCT Pub. Date: Feb. 21, 2019

(65) Prior Publication Data
US 2021/0363376 A1   Nov. 25, 2021

(30) Foreign Application Priority Data
Aug. 18, 2017  (MX) .................. MX/A/2017/010634

(51) Int. Cl.
| | | |
|---|---|---|
| *C09D 133/08* | (2006.01) | |
| *C09D 7/80* | (2018.01) | |
| *C09D 7/65* | (2018.01) | |
| *C09D 7/40* | (2018.01) | |
| *C09D 7/43* | (2018.01) | |
| *C09D 7/47* | (2018.01) | |
| *B05D 1/26* | (2006.01) | |
| *B05D 3/02* | (2006.01) | |
| *B05D 5/00* | (2006.01) | |
| *B05D 7/00* | (2006.01) | |
| *C08L 17/00* | (2006.01) | |
| *C08L 25/06* | (2006.01) | |
| *C08L 67/02* | (2006.01) | |

(52) U.S. Cl.
CPC ............ *C09D 133/08* (2013.01); *B05D 1/26* (2013.01); *B05D 3/0272* (2013.01); *B05D 5/00* (2013.01); *B05D 7/586* (2013.01); *C09D 7/43* (2018.01); *C09D 7/47* (2018.01); *C09D 7/65* (2018.01); *C09D 7/69* (2018.01); *C09D 7/70* (2018.01); *C09D 7/80* (2018.01); *C08L 17/00* (2013.01); *C08L 25/06* (2013.01); *C08L 67/02* (2013.01)

(58) Field of Classification Search
CPC .................................................. C09D 133/08
See application file for complete search history.

(56) References Cited

U.S. PATENT DOCUMENTS 7,760,518 B2   7/2010   Bäurle et al.

FOREIGN PATENT DOCUMENTS

| AU | 2003262477 | 6/2004 |
|---|---|---|
| CN | 105036619 A | 11/2015 |
| JP | H0598227 A | 4/1993 |
| JP | 2004-035681 A | 2/2004 |
| KR | 2003-0029673 A | 4/2003 |
| KR | 101522550 B1 | 5/2015 |
| WO | 2011/026757 | 3/2011 |

OTHER PUBLICATIONS

Machine translation of WO 2011/026757 A1, published Mar. 10, 2011, <<retrieved from espacenet.com on Oct. 22, 2022 >>.*

* cited by examiner

*Primary Examiner* — Vickey Nerangis
(74) *Attorney, Agent, or Firm* — Ladas & Parry LLP

(57) ABSTRACT

The invention relates to a waterproofing composition with high resistance to different weather conditions and improved insulating and anti-impact properties and which is easy to apply and more durable, and to materials based on same. The composition comprises acrylic resins, water, polymeric particulates and additives.

30 Claims, No Drawings

HIGH-RESISTANCE WATERPROOFING COMPOSITION AND PRODUCTS MADE USING SAME

RELATED APPLICATION

This application is an application under 35 U.S.C. 371 of International Application No. PCT/IB2018/000905 filed on 17 Aug. 2018, which claims priority from MX/a/2017/010634 filed 18 Aug. 2017, the entire contents of which are incorporated herein by reference.

FIELD OF THE INVENTION

The present invention relates to an acrylic waterproofing composition with high resistance to various weather conditions, used to manufacture waterproofing materials therefrom, with improved insulating and anti-impact characteristics, of easy application and extended durability.

BACKGROUND OF THE INVENTION

Given the increase in temperature on the planet, caused largely by the emission of greenhouse gases by human activities, changes in the weather conditions of many areas of the planet, including those inhabited by humans, are frequent, for example, increase in periods of sun or more intensity, torrential rains and even hailstorms. This causes the surfaces that support these conditions, such as roofs, to be worn out by heat, humidity and impacts, according to each weather condition indicated, further aggravated by the short-term succession of said events.

In this sense, some useful compositions have been designed to be applied outside buildings and other constructions associated therewith. Some of these compositions involve materials that, by themselves or in combination with others, are intended to be thermal insulators and impervious to water, among other functions. An example of such materials are acrylic resins.

Within the known technologies in thermal insulating and waterproofing compositions, several examples are found. Some of them will be defined below.

Application MX/a/2011/002241 describes a waterproofing composition comprising an acrylic or modified acrylic resin with particulates selected from glass, ceramic or polymer microspheres and/or mixtures thereof. In addition, it includes ground tire particles, fillers, additives such as dispersants, humectants, silicone antifoamings/mineral oils-, bactericides, antifreeze-glycols-, coalescents, thickeners, ammonium ion pH regulator, among others, fibers, pigments and water, optionally, also water hardness controllers, flame retardants and pigments.

In KR 101522550 B1 Patent, an impermeable sheet is described comprising isoprene-isobutylene rubber, recycled butyl or synthetic rubber and other components, such as ethylene glycol, benzotriazole blocking agents and acrylic-based monomers.

The JP 2004035681 A application refers to a low-cost waterproofing material with excellent impermeability and weather resistance; it can be used with various wastes as a filler and is useful as a recycling source. The waterproofing material of the invention comprises an acrylic resin as a binder, various types of inorganic substances and wastes as filler.

Another invention related to waterproofing compositions and materials is found in U.S. Pat. No. 7,760,518 B2, which teaches a method to form a composite material, which includes a substrate material selected from lignocellulosic material, rubber and non-recyclable plastic, such as polyethylene, polypropylene, polystyrene or PET, an emulsion binder with recycled plastics, hot water and emulsifiers.

In accordance with the above, the indicated technologies, and others, are designed from polymeric and particulate compounds, among other additive components. However, such compositions and materials made from them, even though they may have waterproofing and thermal insulating characteristics, tend to have limited durability in the extreme climates that are currently. The waterproofing products of common acquisition in the market have to be reapplied every certain time, for example, between 1 and 2 years, since the materials they use are not properly formulated to have characteristics of greater durability in extreme climates or the succession of the same. In other words, the increased solar radiation and the extensive rainy seasons cause a rapid deterioration of these commercial waterproofing materials, and even those of the indicated technologies. In addition, these compositions, materials and waterproofing products do not mention or appear to have anti-impact properties, necessary in areas where, in addition to extreme climates of solar radiation and rainfall, there are also hailstorms, reason why their deterioration is often faster. These technologies have been formulated based on the characteristics of certain types of materials, but they do not provide outstanding results, nor have been established the specific effective materials and defined quantities that contribute to the extension of their durability to any of the indicated climatic conditions.

Therefore, there is a need to provide a composition with impermeability, thermal insulation and anti-impact characteristics, which has high durability in materials made from it, to be used in buildings where it is desired to implement said characteristics.

SUMMARY OF THE INVENTION

An object of the present invention is to provide a waterproofing composition with high resistance to various weather conditions and extended durability.

Another object of the present invention is to provide a waterproofing material with high resistance to various weather conditions and extended durability, easily applied to surfaces to be waterproofed, regardless of weather conditions at the time of application.

In a further object, the present invention provides a method for manufacturing a waterproofing material with high resistance to various weather conditions and extended durability.

DETAILED DESCRIPTION OF THE INVENTION

In an object of the invention, in a general way, it refers to a waterproofing composition with high resistance to various weather conditions and extended durability comprising water-based acrylic resin, polymeric particulates, water and additives, wherein the polymeric particulates consist of rubber particulates and derivatives thereof, expanded polystyrene particulates and derivatives thereof, and particulates of one or more rigid polymers, selected from the group comprising of PET, HDPE, LDPE, PVC, PP, PS, PU and mixtures thereof.

As mentioned above, the main components of the compositions known in the art indicate very large amounts for them, which does not ensure outstanding characteristics throughout the entire range for a single component respect to the rest, and even more when the amount of the rest of them is not optimized to obtain an outstanding result in durability, impermeability and impact resistance. Therefore, in a preferred embodiment of the present invention, the waterproofing composition has tested its outstanding results in a range of about 15% to about 35% by weight of the water-based acrylic resin, from about 15% to about 25% by weight of polymeric particulates, from about 30% to about 50% by weight of water, and from about 15% to about 25% by weight of additives, respect to the total waterproofing composition. In a more preferred embodiment, the waterproofing composition comprises about 16% to about 31% by weight of water-based acrylic resin, about 17% to about 20% by weight of polymeric particulates, about 32% to about 46% by weight of water, and about 19% to about 21% of additives, respect to the total waterproofing composition.

The acrylic resin is an acrylic resin from styrene-acrylic copolymers with plasticity required for the purposes of the present invention, including a mixture of two or more acrylic resins.

The polymeric particulates, as mentioned above, are divided into three types, which are rubber and derivatives thereof, expanded polystyrene and derivatives thereof, and rigid polymers, selected from the group comprising of PET, HDPE, LDPE, PVC, PP, PS, PU and mixtures thereof. It is preferred that the rubber materials and their derivatives be in greater proportion respect to the other two types, since their density is usually greater than that of the rest, occupying a volume like the other two within the composition. In an enunciative example, but not limitative to the foregoing, the polymeric particulates comprise about 65% to about 80% by weight of rubber particulates, or derivatives thereof, about 5% to about 10% by weight of expanded polystyrene and derivatives of the same, and about 15% to about 25% by weight of rigid polymers, respect to the total polymeric particulates. At least one of the materials corresponding to the polymeric particulates may be a waste material, due to the environmental advantages that this represents. It is preferred that the three polymeric particulates be waste materials. For example, from rubber and its derivatives, which should be understood as materials that are obtained and processed from natural or artificial sources (rubber), vulcanized rubber from tires or waste tires is preferred, as well as expanded polystyrene materials that can be objects made of materials known as unicel, and the rigid polymers can be taken from bottles of various uses and other waste plastic objects, the preferred rigid polymer being PET.

Rubber and its derivatives, as well as expanded polystyrene and its derivatives, provide strength, toughness, sound insulation and dielectric properties to the composition, while rigid polymers provide firmness to the composition, when products made from the composition are manufactured, as will be detailed later. The expanded styrene polymers provide good thermal insulation and low resistance to compression due to thermal expansion into the product, by the rest of the material, which results in a low thermal expansion of the products made from the composition, desirable from the point of view of durability.

The sizes of the rubber particulates are between about 80 mesh (0.177 mm) and about 3 mesh (6.73 mm) for the waterproofing composition of the present invention. The expandable polystyrene particulates have a size between about 0.177 mm and about 10 mm. The rigid polymeric particulates have a size between about 0.01 mm and about 1 mm. Of course, can be used and expressed in the composition and its examples various particulates sizes in the waterproofing composition or a given range, or else, an average particulate size obtained from all particulates with sizes within the range corresponding to particulate type.

Respect to the additives useful for the invention, these can be thickeners, biocides, pH neutralizers/stabilizers, antifoamings, dispersants, fillers, coalescents, desiccants, pigments, among others.

In one embodiment, the waterproofing composition of the present invention includes at least one thickener. It is preferred that the composition of the present invention has at least one thickener based on nonionic etherified polysaccharide compounds and at least one other thickener based on polyethylene glycol aminoplast compounds. Thickeners based on nonionic etherified polysaccharide compounds can be in an amount of about 0.15% to about 0.35% by weight, of the total waterproofing composition of the present invention. Thickeners based on polyethylene glycol aminoptast compounds can be in an amount of about 0.35% to about 0.50% by weight, of the total waterproofing composition of the present invention.

In one embodiment, the waterproofing composition of the present invention includes at least one biocide, which can be an organic compound such as 1,2-benzisothiazolin-3-one or inorganic, such as sodium hydroxide. The biocides can be in an amount of about 0.10% to about 0.20% by weight, of the total waterproofing composition of the present invention.

In one embodiment, the waterproofing composition of the present invention includes at least one pH neutralizer/stabilizer, preferably based on ammonium compounds or organic amines or derivatives thereof. Mixtures of two or more pH neutralizers/stabilizers can also be used. The pH neutralizers/stabilizers can be in an amount of about 0.01% to about 0.05% by weight, of the total waterproofing composition of the present invention.

In one embodiment, the waterproofing composition of the present invention includes at least one antifoaming based on hydrophobic components. Particularly, antifoamings are preferred which comprise mixtures of paraffinic mineral oils and silicone. Antifoamings can be in an amount of about 0.25% to about 0.35% by weight, of the total waterproofing composition of the present invention.

In one embodiment, the waterproofing composition of the present invention includes at least one dispersant, preferably based on ammonium compounds of an acrylate copolymer, amino alcohols, such as AMP, or mixtures thereof. The dispersants can be in an amount of about 0.25% to about 0.35% by weight, of the total waterproofing composition of the present invention.

In one embodiment, the waterproofing composition of the present invention includes at least one filler, which can be of various types. Among the preferred types are inorganic carbonates, such as calcium carbonate and siliceous sands, and mixtures thereof. The fillers can be in an amount of about 10% to about 20% by weight, of the total waterproofing composition of the present invention.

In one embodiment, the waterproofing composition of the present invention includes at least one adherent coalescent based on glycol ether. The coalescents can be in an amount of about 0.3% to about 0.7% by weight, of the total waterproofing composition of the present invention.

In one embodiment, the waterproofing composition of the present invention includes at least one desiccant based on ethylene glycol compounds. Particularly, MEG is preferred, which also provides the leveling function to the waterproofing composition. Desiccants can be in an amount of about 1% to about 1.25% by weight, of the total waterproofing composition of the present invention.

In one embodiment, the waterproofing composition of the present invention includes at least one pigment. Said at least one pigment can be any of the state of the art useful for waterproofing compositions, for example, of organic nature, for example, light-stable, or inorganic, such as metal oxides. Titanium dioxide is one of the preferred pigments for the invention within the group of inorganic pigments, but in the present invention it is not limited only to it. The pigments can be in an amount of about 1% to about 2% by weight, of the total waterproofing composition of the present invention.

Other additives useful for the invention may optionally be included in the present invention, which provide desirable characteristics, which will be obvious to a person skilled in the technical field, in accordance with the need for some additive.

The composition of the present invention is prepared by special considerations for this, to achieve the outstanding results thereof. Since the components have different chemical natures, the simple mixing of the components does not allow their correct integration, forming lumps of a certain component and/or areas of different density and different protection against attack by microorganisms, which would result in a lack of homogenization of the outstanding characteristics of the waterproofing composition, to detriment of it. Thus, inventively, it was found that the preparation of the waterproofing composition of the present invention should be done in two main phases. The first of these involves the preparation of a primary solution, which will facilitate the incorporation of the subsequent components indicated in the second phase. Said first phase comprises adding to a container and mixing part of the water designated for the waterproofing composition, additives comprising the at least one thickener based on nonionic etherified polysaccharide compounds, part of the at least one biocide designated for the waterproofing composition, and the at least one pH neutralizer/stabilizer. The second step comprises adding and mixing, in the container where the primary solution is located, the rest of the water, additives, water-based acrylic resin, polymeric particulates, and the at least one thickener based on polyethylene glycol aminoplast compounds. Preferably, the part of water for the first phase is from about 15% to about 30% by weight of the total water of the waterproofing composition, and the part of the biocide for the first phase is from about 6% to about 20% by weight of the total biocide in the waterproofing composition. Conveniently, for proper homogenization, stirring for mixing is continuous in the first phase and until the addition of additives in the second phase, but is suspended to add the water-based acrylic resin, and stirring is restored again. The polymeric particulates are added without mediating agitation suspension of the previously added components, as well as for the at least one thickener based on polyethylene glycol aminoplast compounds.

In another object, the present invention relates to a waterproofing material with high resistance to various weather conditions and extended durability, made from the waterproofing composition. Said waterproofing material is presented in sheet form.

In one embodiment, the waterproofing material comprises the waterproofing composition of the present invention.

In one embodiment, the waterproofing material comprises a plurality (two or more) of layers made of the waterproofing composition of the present invention, and at least one mesh, wherein each of the at least one mesh is joined by its upper and lower parts with a layer made from the waterproofing composition of the present invention. It will be evident that the waterproofing material of the present invention is an immurement of each mesh between two layers, with the understanding that there will always be layers at the upper and lower ends of the waterproofing material, and never a mesh at said ends, as well as the lower layer of one mesh can be the top layer of another, when two or more meshes are present in the waterproofing material, being layers and meshes in succession. In a more preferred embodiment, the waterproofing material comprises a lower layer made of the waterproofing composition of the present invention, an upper layer made of the waterproofing composition of the present invention, and a mesh, which is intermediate between the lower layer and the top layer. In all these embodiments, the mesh can be metallic or plastic, providing greater resistance to the material, without affecting its flexibility, for example, it allows said waterproofing material to be rolled up.

The thickness of the waterproofing material of the present invention can be variable, from about 1 mm. Preferably, the thickness of the waterproofing material of the present invention is from about 1 mm to about 15 mm, the most preferred thicknesses being those that are located at about 3 mm, about 5 mm and about 10 mm.

In another object of the invention, there is provided a method for manufacturing the waterproofing material of the present invention, which generally comprises the steps of providing the waterproofing composition of the present invention to a hopper with stirring means and dispenser, dispensing the waterproofing composition in a mold, adjusting the waterproofing composition poured to the mold at a predetermined height, drying out the waterproofing composition in the mold to obtain a sheet, and removing the sheet from the mold.

In one embodiment of the method for manufacturing the waterproofing material of the present invention, the step of adjusting the height is carried out by means of a leveling blade, and the drying step is carried out by means of an oven or drying in the open air, or by ventilation.

In one embodiment of the method for manufacturing the waterproofing material of the present invention, the mold is transported through the oven by a conveyor belt. At the exit from the oven, the obtained sheet is removed and placed again under the dispenser, on the conveyor belt, and a mesh is placed on said sheet, and a mold is placed, aligning with the edges of the sheet and the mesh. Subsequently, the waterproofing composition is dispensed in the mold again, the height of the waterproofing composition in the mold is adjusted and the drying step in the oven is performed again, to obtain a laminate with two layers or sheets of waterproofing composition and an intermediate layer of mesh. More meshes can be added to the waterproofing material, with the indicated steps.

In all the above embodiments, an additional spraying step of the waterproofing composition on the mold, between the leveling and drying steps, can be applied in order to reduce roughness or fill large spaces, for example, caused by bubbles. Also, the waterproofing material is flexible, and capable of being rolled, for easy handling and transport.

In all the above embodiments, the sheets and laminates obtained can be coated on their outer face (in contact with the weather) each one with a finishing waterproofing composition, from elastomeric acrylic compounds, in order to close small pores of the surface and give a substantially smooth finish.

EXAMPLES

The present examples are based on at least one preferred embodiment of the invention and, therefore, they should be considered as enunciative but not limitative of the scope of the waterproofing composition of the present invention.

Example 1. Preparation of Waterproofing Composition

In a conventional size mixing vessel (for example 1,000 to 10,000 l) a primary solution is prepared, adding about 80.44 l of water (1 l=1 kg), about 2.26 kg ESACOL ED 30 W (etherified polysaccharide based thickener), with about 0.14 kg of Proxel GXL (biocide) and about 0.28 kg of AMP-95® (pH neutralizer/stabilizer), under continuous mixing for 3 minutes. Next, are poured about 382.46 l of water, homogenizing for 3 minutes, about 1.98 kg of Proxe GXL and is homogenized for 3 minutes, about 4.09 kg of BYK-035 (antifoam) and is homogenized for 3 minutes, about 4.09 kg of BYK-156 (dispersant) and is homogenized for 3 minutes, about 218.47 kg of OMYACARB® 10-SJ (calcium carbonate) and is homogenized for 10 minutes, about 7.34 kg of Butyl CELLOSOLVE® (adherent coalescent) and is homogenized for 3 minutes, about 15.67 kg of MEG (desiccant) and is homogenized for 3 minutes, and about 19.62 kg of TI PURE® (pigment, titanium dioxide), is homogenized for 10 minutes and mixing is suspended. Next, about 426.21 kg of DC EA 155 (water-based acrylic resin) is added, and then mixing is restarted for 16 minutes, about 173.02 kg of vulcanized rubber particulate from waste tire with sizes between 0.80 mm and up to 5 mm is added, mixed for 8 minutes; about 19.62 kg of unicel waste beads with average size of about 5 mm are added and mixed for 8 minutes; about 49.11 kg of PET powder with an average size of about 0.05 mm and mixed for 8 minutes, and about 6.49 kg of OPTIFLO H370 (thickener) is added and is homogenized for 8 to 16 minutes.

The resulting composition is as follows:

| Component | Kg |
|---|---|
| Water-based acrylic resin | 426.21 |
| Water | 462.90 |
| Rubber particulate | 173.02 |
| Expanded polystyrene particulate | 19.62 |
| Rigid Polymer Particulate | 49.11 |
| Additives | 280.43 |

The composition thus obtained has the following characteristics:

| Bulk density | 956.58 kg/m3 |
|---|---|
| Thermal conductivity | 0.0570 W/mK |
| Water vapor permeability | 0.003 ng/Pa-s-m |
| Moisture adsorption | % mass 5.34; % vol. 5.007 |
| Water absorption | % mass 4.62 |

Example 2. Preparation of Waterproofing Composition

In a conventional size mixing container (for example 1,000 to 10,000 l) a primary solution is prepared, adding about 128.35 l of water (1 l=1 kg), about 3.26 kg ESACOL ED 30 W, with about 0.25 kg of Proxel GXL and about 0.38 kg of AMP-954s, under continuous mixing for 3 minutes. Next, are poured about 382.79 l of water, homogenizing for 3 minutes; about 1.76 kg of Proxel GXL and is homogenized for 3 minutes; about 3.63 kg of BYK-035 and is homogenized for 3 minutes; about 3.63 kg of BYK-156 and is homogenized for 3 minutes; about 198.42 kg of OMYACARB® 10-SJ and is homogenized for 10 minutes; about 6.64 kg of Butyl CELLOSOLVE® and is homogenized for 3 minutes; about 14.29 kg of MEG and is homogenized for 3 minutes, and about 17.80 kg of TI PURE®, is homogenized for 10 minutes and mixing is suspended. Next, about 267.86 kg of DALECRYL is added, and then the mixing is restarted for 16 minutes; about 157.18 kg of vulcanized rubber from waste tire, with an average size of about 0.25 mm are added and mixed for 8 minutes; about 17.80 kg of unicel waste particulates with an average size of about 6 mm are added and mixed for 8 minutes; about 44.62 kg of PE-PP-PET mixture powder (1:1:3, p/p)) with an average size of about 0.03 mm is added and mixed for 8 minutes, and about 4.76 kg of OPTIFLO H370 is added and is homogenized from 8 to 16 minutes.

The resulting composition is as follows:

| Component | Kg |
|---|---|
| Water-based acrylic resin | 267.86 |
| Water | 511.14 |
| Rubber particulate | 157.18 |
| Expanded polystyrene particulate | 17.80 |
| Rigid Polymer Particulate | 44.62 |
| Additives | 254.82 |

The composition thus obtained has the following characteristics:

| Bulk density | 1003.4 kg/m3 |
|---|---|
| Thermal conductivity | 0.0589 W/mK |
| Water vapor permeability | 0.004 ng/Pa-s-m |
| Moisture adsorption | % mass 5.35; % vol. 5.570 |
| Water absorption | % mass 5.90 |

Example 3. Preparation of Waterproofing Composition

In a conventional size mixing vessel (for example 1,000 to 10,000 l) a primary solution is prepared, adding about 109.19 l of water (1 l=1 kg), about 2.63 kg ESACOL ED 30 W, with about 0.25 kg of Proxel GXL and about 0.34 kg of MCR-95 (pH neutralizer/stabilizer), under continuous mixing for 3 minutes. Next, about 275.77 l of water are poured, homogenizing for 3 minutes; about 1.19 kg of Proxel GXL and is homogenized for 3 minutes; about 2.46 kg of BYK-035 and is homogenized for 3 minutes; about 2.46 kg of BYK-156 and is homogenized for 3 minutes; about 134.05 kg of OMYACARB® 10-SJ and is homogenized for 10 minutes; about 4.49 kg of Butyl CELLOSOLVE® and is homogenized for 3 minutes; about 9.65 kg of MEG and is homogenized for 3 minutes, and about 12.02 kg of E172 (red pigment, iron oxides), is homogenized for 10 minutes and the mixing is suspended. Next, about 140.74 kg of DC EA 15S is added, and then the mixing is restarted for 16 minutes; about 106.19 kg of vulcanized rubber particulate from the waste tire with an average size of about 0.7 mm is added and mixed for 8 minutes; about 12.02 kg of unicel beads with an average size of about 4 mm are added and mixed for 8 minutes; about 30.15 kg of PET powder with an average size of about 0.05 mm is added and mixed for 8 minutes, and about 3.22 kg of OPTIFLO H370 is added and homogenized from 8 to 16 minutes.

The resulting composition is as follows:

| Component | Kg |
|---|---|
| Water-based acrylic resin | 140.74 |
| Water | 384.96 |
| Rubber particulate | 106.19 |
| Expanded polystyrene particulate | 12.02 |
| Rigid Polymer Particulate | 30.15 |
| Additives | 172.76 |

The composition thus obtained has the following characteristics:

| | |
|---|---|
| Bulk density | 1022.12 kg/m3 |
| Thermal conductivity | 0.0597 W/mK |
| Water vapor permeability | 0.005 ng/Pa-s-m |
| Moisture adsorption | % mass 5.36; % vol. 5.795 |
| Water absorption | % mass 6.41 |

The compositions of the previous examples can be applied on a surface exposed to the weather.

Example 4. Manufacture of Laminates from the Composition of the Present Invention The waterproofing composition of Example 1 is placed in a hopper with stirring and dispensing means, and is dispensed in a mold on a conveyor belt, the height of the waterproofing composition in the mold is adjusted to a predetermined height by a leveling blade and the mold is entered into an oven to drying. The formed sheet is removed from the mold, having a thickness of about 10 mm. The same procedure is carried out with the waterproofing compositions of Examples 2 and 3, making the necessary height adjustments to obtain thicknesses of 5 mm and 3 mm, respectively. The material thus obtained can be placed on a surface exposed to the weather.

Example 5. Laminates Manufacture with Internal Mesh from the Composition of the Present Invention The three sheets obtained in Example 4 are taken and each one independently is placed again under the dispenser, on the conveyor belt. A metal mesh is positioned and aligned on each of the sheets and a mold whose edges coincide with the edges thereof. The respective waterproofing composition is dispensed on the meshes placed on each sheet, the height of the waterproofing composition is adjusted, according to that of the corresponding sheet, in the mold by means of a blade, and is dried in the oven. A double laminate is obtained, with two sheets of waterproofing composition and metal mesh between each sheet. The material thus obtained can be placed on a surface exposed to the weather.

Example 6. Sheets and Laminates Manufacture from the Composition of the Present Invention The sheets of Example 4 are manufactured again. To these sheets a finishing layer of IMPERCEL® is applied on a face to cover pores and give a substantially smooth appearance. The material thus obtained can be placed on a surface exposed to the weather.

The laminates of Example 5 are manufactured again. To these laminates a finishing layer of IMPERCEL® is applied on the outer face of a sheet to cover pores and give a substantially smooth appearance. The material thus obtained can be placed on a surface exposed to the weather.

While certain features of the invention have been illustrated and described herein, many modifications, substitutions, changes and equivalents will occur to those with knowledge and experience in the art. The invention is described in detail with reference to some particular embodiments, but it should be understood that various other modifications can be made and still be within the spirit and scope of the invention. It should be understood, therefore, that the appended claims are intended to cover all modifications and changes that fall within the true spirit of the invention.

The invention claimed is:

1. A waterproofing composition comprising water-based acrylic resin, polymeric particulates, water and additives, wherein the polymeric particulates consist of rubber particulates, expanded polystyrene particulates, and particulates of one or more rigid polymers, selected from the group comprising of PET, HDPE, LDPE, PVC, PP, PS, PU and mixtures thereof, wherein the water-based acrylic resin is present in a range of about 16% to about 31% by weight, the polymeric particulates are present in a range of about 17% to about 20% by weight, water is present in a range of about 32% to about 46% by weight, and additives are present in a range of about 19% to about 21% by weight, respect to the total waterproofing composition.

2. The waterproofing composition according to claim 1, wherein the polymeric particulates comprise about 65% to about 80% by weight of the rubber particulates, about 5% to about 10% in weight of the expanded polystyrene particulates, and about 15% to about 25% by weight of the particulates of one or more rigid polymers, respect to the total polymeric particulates.

3. The waterproofing composition according to claim 2, wherein the materials of the polymeric particulates may be new or from waste.

4. The waterproofing composition according to claim 3, wherein the rubber particulates comprise vulcanized rubber from tires or waste tires, and the particulates of one or more rigid polymers comprise PET.

5. The waterproofing composition according to claim 4, wherein the rubber particulates have a size between about 80 mesh (0.177 mm) and about 3 mesh (6.73 mm), expandable polystyrene particles have a size between about 0.177 mm and about 10 mm, and the particulates of one or more rigid polymers have a size between about 0.01 mm and about 1 mm.

6. The waterproofing composition according to claim 1, wherein the additives are selected from thickeners, biocides, pH neutralizers/stabilizers, antifoaming agents, dispersants, fillers, adherent coalescents, desiccants pigments and mixtures of two or more of these.

7. The waterproofing composition according to claim 6, wherein said additives-comprises at least one thickener based on nonionic etherified polysaccharide compounds in an amount of about 0.15% to about 0.35% by weight, of the total waterproofing composition, and at least one other thickener based on polyethylene glycol aminoplast compounds in an amount of about 0.35% to about 0.50% by weight, of the total waterproofing composition.

8. The waterproofing composition according to claim 6, wherein said additives comprise at least one biocide and wherein the at least one biocide is present in an amount of about 0.10% to about 0.20% by weight, of the total waterproofing composition.

9. The waterproofing composition according to claim 6, wherein said additives comprise at least one pH neutralizer/stabilizer and wherein said at least one pH neutralizer/stabilizer is present in an amount of about 0.01% to about 0.05% by weight, of the total waterproofing composition.

10. The waterproofing composition according to claim 6, wherein said additives comprise at least one-antifoaming agent based on hydrophobic components; and wherein said at least one antifoaming agent is present in an amount of about 0.25% to about 0.35% by weight of the total waterproofing composition.

11. The waterproofing composition according to claim 6, wherein said additives comprise at least one dispersant, and wherein said at least one dispersant is in an amount of about 0.25% to about 0.35% by weight, of the total waterproofing composition.

12. The waterproofing composition according to claim 6, wherein said additives comprise at least one filler, and wherein said at least one filler is in an amount of about 10% to about 20% by weight, of the total waterproofing composition.

13. The waterproofing composition according to claim 6, wherein said additives comprise at least one adherent coalescent-based on glycol ether, and wherein said at least one adherent coalescent is in an amount of about 0.3% to about 0.7% 7% in weight, of the total waterproofing composition.

14. The waterproofing composition according to claim 6, wherein said additives comprise at least one desiccant based on ethylene glycol compounds, and wherein said at least one desiccant is in an amount of about 1% to about 1.25% by weight, of the total waterproofing composition.

15. The waterproofing composition according to claim 6, wherein said additives comprise at least one pigment, and wherein said at least one pigment is in an amount of about 1% to about 2% by weight, of the total waterproofing composition.

16. The waterproofing composition according to claim 6, wherein said antifoaming agents are mixtures of paraffinic mineral oils and silicone.

17. The method for preparing the waterproofing composition according to claim 1 comprising the steps of:
a) preparing a primary solution comprising part of the water and some of the additives of the waterproofing composition by mixing part of the water contained in the waterproofing composition, at least one thickener additive based on nonionic etherified polysaccharide compounds, part of at least one biocide additive, and at least one pH neutralizer/stabilizer additive, and
b) adding and mixing the rest of the water, the rest of the additives, the water-based acrylic resin, the polymeric particulates, and at least one thickener additive based on polyethylene glycol aminoplast compounds.

18. The method according to claim 17, wherein the part of water for preparing the primary solution is from about 15% to about 30% by weight of the total water of the waterproofing composition, and part of the at least one biocide to prepare the primary solution is from about 6% to about 20% by weight of the total biocide in the waterproofing composition.

19. The method according to claim 17 wherein the mixing is continuous from the preparation of the primary solution and the addition of additives, the mixing is suspended to add the water-based acrylic resin, and the mixing is restored again and is thus preserved for the rest of the components.

20. A waterproofing material in sheet form, comprising the waterproofing composition of claim 1.

21. The waterproofing material in sheet form according to claim 20, wherein said waterproofing material further comprises a plurality of layers made of the waterproofing composition of the present invention and at least one mesh, wherein each of the at least one mesh is attached by its upper and lower part with a layer made of the waterproofing composition.

22. The waterproofing material in sheet form according to claim 21, wherein said waterproofing material comprises a lower layer made of the waterproofing composition, an upper layer made of the waterproofing composition, and a mesh that is intermediate between the lower layer and the upper layer.

23. The waterproofing material in sheet form according to claim 21, wherein the at least one mesh material is selected from metal or plastic.

24. The waterproofing material in sheet form according to claim 20, wherein the thickness of said waterproofing material is from about 1 mm to about 15 mm.

25. The waterproofing material in sheet form according to claim 20, wherein said waterproofing material in sheet form further comprises a layer of a waterproofing composition from elastomeric acrylic compounds on a face thereof.

26. The method of manufacturing the waterproofing material in sheet form of claim 20 comprising the steps of providing the waterproofing composition to a hopper with stirring and dispensing means; having a stirrer and a dispenser; dispensing the waterproofing composition into a mold; adjusting the waterproofing composition poured to the mold to a predetermined height; drying the waterproofing composition in the mold to obtain a sheet, and removing the sheet from the mold.

27. The method according to claim 26, wherein the step of adjusting the height is carried out by means of a leveling blade, and the drying step is carried out by means of an oven, drying in the open air or by ventilation.

28. The method according to claim 27, wherein an additional spraying step of the waterproofing composition on the mold is performed between the leveling and drying steps.

29. The method, according to claim 26, wherein the drying is carried out in an oven and the mold is transported through the same by a conveyor belt, and where at the exit of the oven the obtained sheet is removed and placed again under the dispenser on the conveyor belt, and a mesh is placed on said sheet, and a mold is placed aligned with the edges of the sheet and the mesh, the waterproofing composition being dispensed again in the mold, the height of the waterproofing composition in the mold is adjusted and the drying stage in the oven is again carried out to obtain a laminate with two layers or sheets of the waterproofing composition and an intermediate layer of mesh, and optionally, the steps indicated to add more meshes to the waterproofing material are repeated.

30. The method according to claim 26, wherein a layer of a waterproofing composition from elastomeric acrylic compounds is also applied on a face thereof.

* * * * *